United States Patent

Kim

Patent Number: 5,758,839
Date of Patent: Jun. 2, 1998

[54] REEL OF A TAPE PLAYER

[75] Inventor: Yu-In Kim, Incheon, Rep. of Korea

[73] Assignee: Daewoo Electronics Co., Ltd., Seoul, Rep. of Korea

[21] Appl. No.: 739,598

[22] Filed: Oct. 30, 1996

[30] Foreign Application Priority Data

Oct. 31, 1995 [KR] Rep. of Korea ............. 95-38341

[51] Int. Cl.$^6$ ................. G11B 15/32; G11B 5/008
[52] U.S. Cl. .............. 242/356.5; 242/349; 360/96.3
[58] Field of Search ................. 242/349, 356.5, 242/356.7, 545.1, 564; 360/96.3, 96.4

[56] References Cited

U.S. PATENT DOCUMENTS 5,318,240   6/1994   Lee ................ 242/356.5

FOREIGN PATENT DOCUMENTS 1196754   7/1970   United Kingdom .
1425668   2/1976   United Kingdom .
443510    3/1996   United Kingdom .

Primary Examiner—John Q. Nguyen
Attorney, Agent, or Firm—Beveridge, DeGrandi, Weilacher & Young LLP

[57] ABSTRACT

In a reel of a tape player for recording/reproducing information on/from a tape, a rotating reel is installed on a top of a main shaft which is placed on a plate of a deck. A reel spindle has a through cylindrical rod into which the main shaft is to be inserted and an accommodating portion. The accommodating portion has a first circular plate formed to be extended radially from bottom of the hollow cylindrical rod to the outside, and a first side wall formed to be bent upwardly from a circular edge of the first circular plate. A plurality of first ribs are upwardly projected and arranged in radial direction on upper surface of accommodating portion. The through cylindrical rod of the reel spindle is inserted into a through hole of a reel gear. The reel gear is placed on the accommodating portion of the reel spindle. A plurality of second ribs downwardly projected and arranged in radial direction on bottom surface of the reel gear. In order to generate friction, the accommodating portion of the reel spindle is filled with gel.

7 Claims, 4 Drawing Sheets

1

REEL OF A TAPE PLAYER

BACKGROUND OF THE INVENTION

1. Field of the Invention

The present invention relates to a reel of a tape player. More particularly, the present invention relates to a reel of a tape player for improving reproducing accuracy by stabilizing any slippage of tape when it is wound around a winding reel off a feeding reel in tape cassette and so on.

2. Description of the Prior Arts

Generally, there are installed two reels of a feeding reel and a winding reel in a cassette tape deck and a VTR deck and information is recorded on or reproduced from the tape using head while tape is wound round the winding reel off the feeding reel. In reproducing operation, the winding reel is rotated by a driving operation of a reel operating motor contacted with it. The feeding reel feeds tape to the winding reel to be rotated following rotation of the winding reel. When the tape is running from the feeding reel to the winding reel, a rotational speed of the winding reel is controlled to keep a constant running speed of the tape. To keep the running speed of the tape constant, the feeding reel and the winding reel undergo changes in their rotating speeds, e.g., the feeding reel is gradually higher in its rotational speed. To give the tape a proper torque in running of the cassette tape, the feeding reel and the winding reel are provided with felt. Furthermore, even though the rotational motion of the winding reel is stopped by the reel driving motor, the feeding reel continues a rotational motion by inertia and so the tape is unwound too much. As a result, when the mode has been changed to PLAY mode, the unwound tape causes the inferior quality of the sound, and what is worse, the tangle of the tape occurs. Furthermore, when the mode is changed to STOP mode, PLAY mode, REV mode, FP mode, REV mode, etc., the feeding reel can continue the rotational motion by inertia. Similarly, the tape is unwound too much, which causes the inferior quality of the sound or the tangle of the tape. Accordingly, the feeding reel and the winding reel are respectively provided with felt to prevent errors and damage to the tape or the tape player generated by the inertial motion of the feeding reel or the winding reel.

This felt generates slippage in the reels to allow the proper torque to the tape, whereby the recorded signals are clearly out on the head. The running direction of tape depends on the operating mode and a feeding reel and a winding reel in forward running are transformed into a winding reel and a feeding reel in reverse running, respectively. Therefore, the feeding reel and the winding reel are similar to each other in construction.

These conventional reels of tape players as shown above are described in U.S. Pat. No. 4,696,439 (issued to Sukigara et al.), U.S. Pat. No. 5,222,685 (issued to Furuhara et al.), etc.

FIG. 1 is a exploded perspective view for showing a reel of tape player with felt according to the prior art, and FIG. 2 is a front sectional view for showing the reel of the tape player with felt of FIG. 2.

As shown in FIGS. 1 and 2, a winding reel (not shown) and a feeding reel 20 are installed at a predetermined interval on a plate 10 of a deck. Since the winding reel and the feeding reel 20 are selectively determined according to operating mode, the winding reel and the feeding reel are the same.

Hereinafter, the feeding reel will be described.

A hollow cylindrical boss 21 with a predetermined diameter of which a top is open is installed on a predetermined position of plate 10. A cylindrical main shaft 24 is inserted into the top of boss 21. A rotating reel 23 is fixed at the top of main shaft 24 for rotating feeding reel 2. Rotating reel 23 is to receive a cassette tape to be rotated by rotation of rotating reel 23. A reel spindle 27 is inserted into main shaft 24 at upper position of boss 21. Reel spindle 27 has a through cylindrical rod 27a formed at a center thereof and a circular plate 27b extended radially from bottom of rod 27a to the outside. A felt 28 is put on circular plate 27b of reel spindle 27. Felt 28 is made of wool, etc. A reel gear 25 is put on the felt. Reel gear 25 is engaged with a gear contacted with the winding reel. Reel gear 25 has a groove (not shown) with a determined depth formed at a bottom thereof. The felt 28 and the circular plate 27b of the reel spindle are inserted closely into this groove. A spring 26 is installed to be penetrated by the main shaft 24 at the upper position of the reel gear 25. Spring 26 is bound in the main shaft 24 by the rotating reel 23 installed at the top of the main shaft 24. Spring 26 keeps the top of reel gear 25 down with an elastic repelling force so that reel gear 25 can stick to the felt 28 and the circular plate 27b of the reel spindle.

According to the reel of the tape player with felt, in the state that the tape is inserted into the rotating reel installed on the top of the feeding reel, when playing the winding reel is rotated by the reel driving motor (not shown) while the feeding reel 20 installed at a predetermined interval from the winding reel is continuously rotated. At this time, the cassette tape is wound from the feeding reel to the winding reel via the head, whereby the reproduction of information is carried out.

The winding reel is rotated at the proper speed so that the cassette tape can run at a constant speed. Here, reel gear 25 of the feeding reel 20 is rotated on the main shaft 24 fixed on boss 21 of plate 10 in the state it is pressurized by spring 26. Therefore, the felt 28 is put between the reel gear 25 and the circular plate 27b of the reel spindle 27 to generate slips.

Due to these slippages, the winding speed of the winding reel and the unwinding speed of the feeding reel are in balance.

However, since the felt which is put between the reel gear and the reel spindle to control slippages is made of wool, flannel, etc., the felt will abrade resulting in a decrease in the coefficient of friction when it has been used during a long time. The functional effect of the felt declines. Therefore, similarly to the case without felt, the very problem is generated in that the quality of the sound not only deteriorates when reproducing the cassette tape but in addition the tape is tangled.

SUMMARY OF THE INVENTION

The present invention is intended to overcome the above-mentioned and numerous other disadvantages and deficiencies of the prior art. Therefore, it is an object of the present invention to provide a reel of a tape player for improving accuracy of reproduction by stabilizing slippage of tape when it is wound around a winding reel off a feeding reel in tape cassette and so on.

To achieve the above object of the present invention, there is provided a reel of a tape player for recording/reproducing information on/from a tape which comprises:

a main shaft which is rotatably placed on a plate of a deck and has a rotating reel contacted with a top of the main shaft;

a reel spindle which has a through cylindrical rod into which the main shaft is to be inserted and an accommodating portion, the accommodating portion being extended radially from bottom of rod to the outside and having side wall formed to be bent upwardly an end of a radial extension thereof;

a reel gear which is placed on the accommodating portion of the reel spindle, the reel gear having a through hole through which the through cylindrical rod is inserted; and gel with which the accommodating portion of the reel spindle is filled to be contacted with a lower surface of the reel gear for generating friction between the reel spindle and the reel gear.

The accommodating portion of the reel spindle has a first circular plate formed to be extended radially from bottom of the hollow cylindrical rod to the outside and a first side wall formed to be bent upwardly from a circular edge of the first circular plate.

The accommodating portion of the reel spindle has a plurality of first ribs upwardly projected on an upper surface thereof and arranged in radial direction.

The reel gear has a second circular plate with a through hole formed at a center thereof and a second side wall formed to be bent downwardly from a circular edge of the second circular plate.

The reel gear has a plurality of second ribs downwardly projected on a bottom surface thereof and extended in radial direction.

According to the reel of the tape player, slippage is controlled by gel which is filled between the reel gear and the reel spindle. Since gel cannot be easily abraded even though it has been used during a long time, slippage is generated to the same extent as the beginning. Even though gel will somewhat abrade due to use over a long time, slippage is still generated to almost the same extent as the beginning due to the viscous property until gel is worn out. The functional effect of the felt declines. Therefore, slippage of tape is stabilized when it is wound around a winding reel off a feeding reel in tape cassette and so on, and accuracy of reproduction is increased.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENTS

Hereinafter, the preferred embodiments of this invention will be described in detail with reference to the accompanying drawing.

Figure 1:
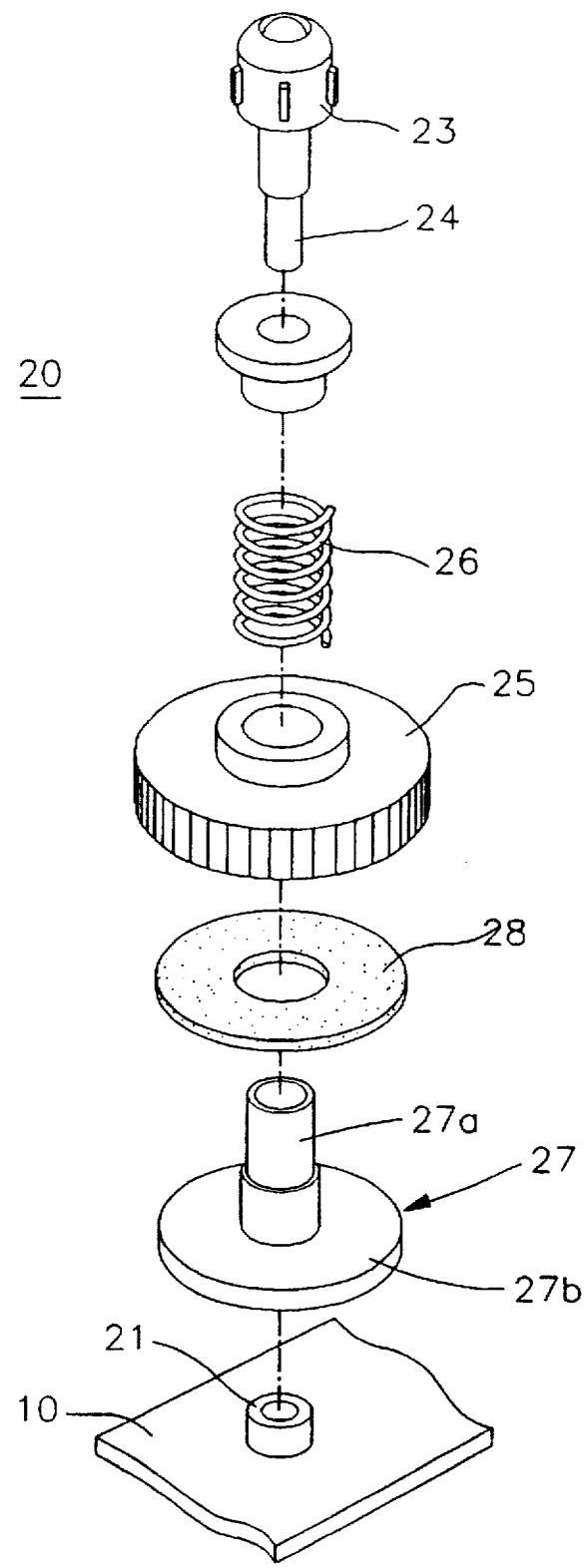
FIG. 1 is an exploded perspective view for showing a reel of a tape player with felt according to the prior art.
Figure 2:
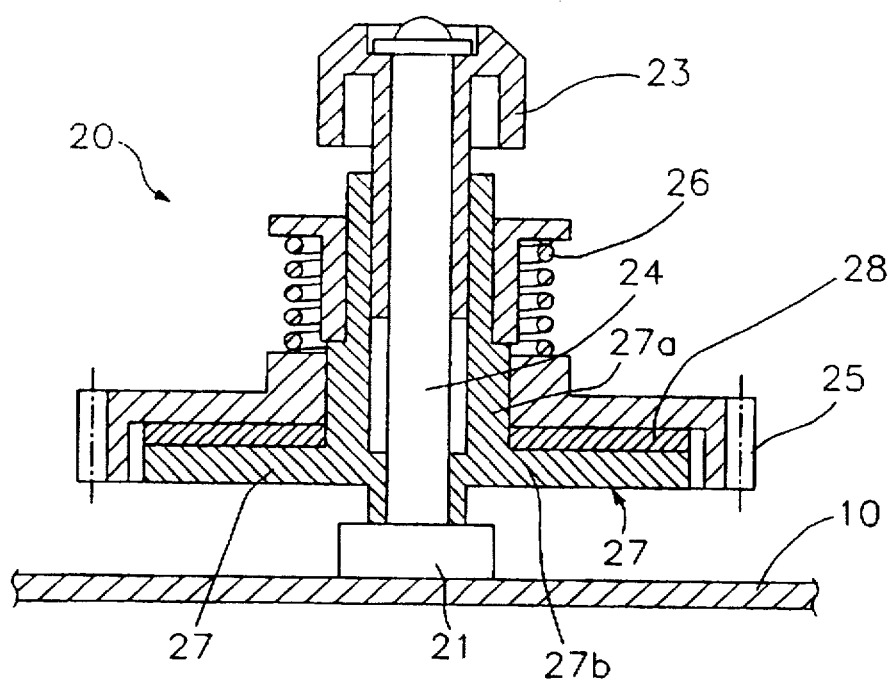
FIG. 2 is a front cross-sectional view for showing the conventional reel of a tape player with felt of FIG. 1.
Figure 3:
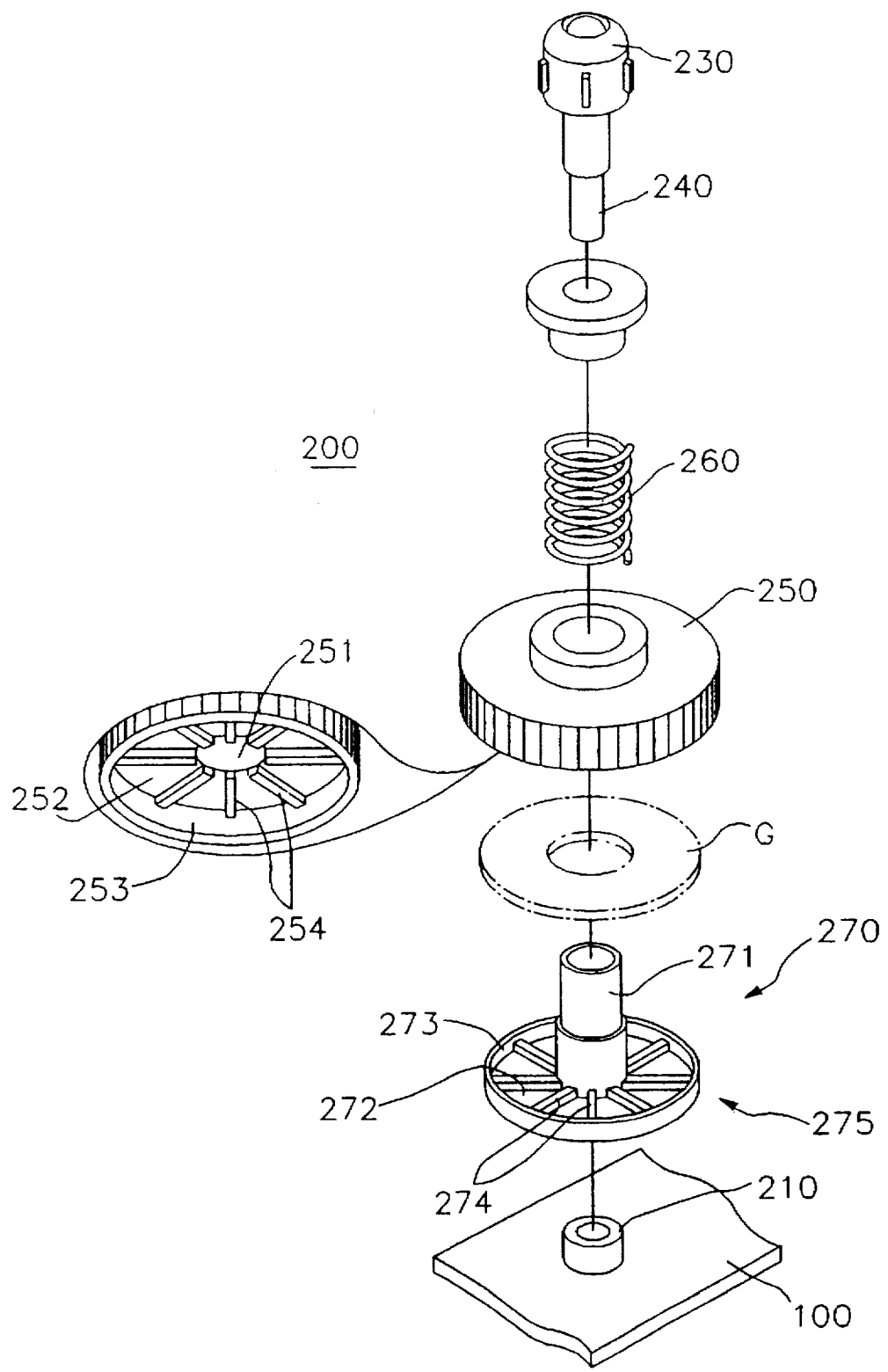
FIG. 3 is an exploded perspective view for showing a reel of a tape player with gel according to the present invention.
Figure 4:
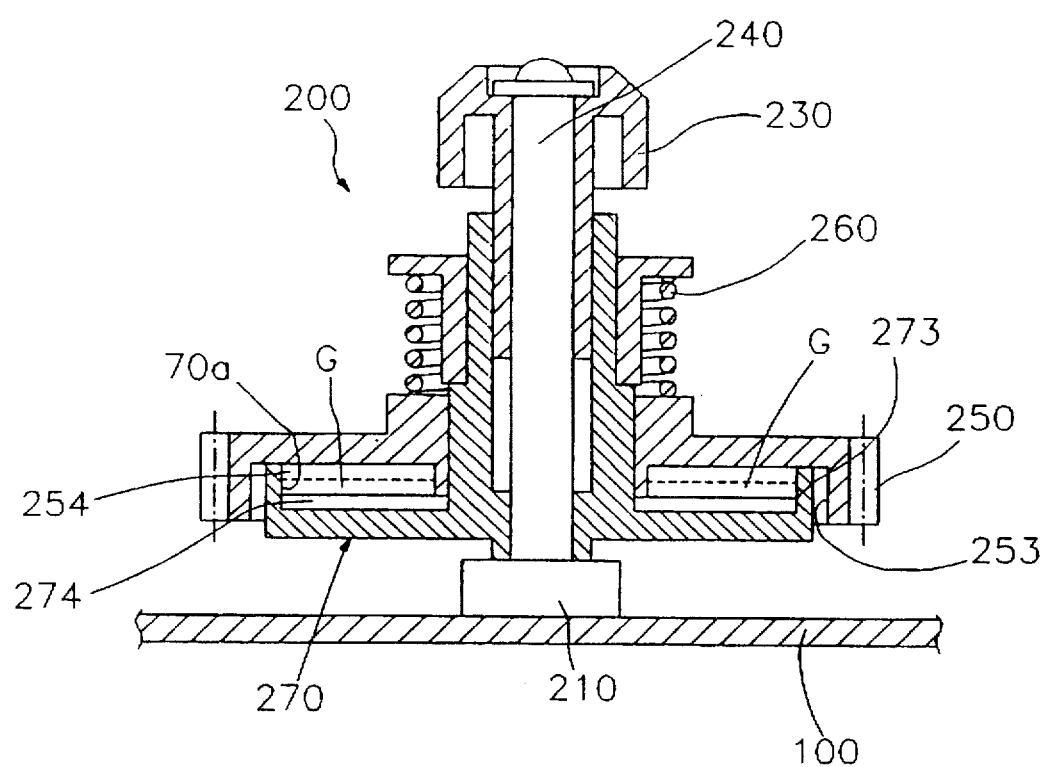
FIG. 4 is a front cross-sectional view for showing the reel of a tape player with gel of FIG. 3.

FIG. 3 is an exploded perspective view for showing a conventional reel of a tape player with gel according to the present invention. FIG. 4 is a front cross-sectional view for showing the conventional reel of a tape player with gel of FIG. 3.

As shown in FIGS. 3 and 4, a winding reel (not shown) and a feeding reel 200 are installed at a predetermined interval on a plate 100 of a deck. Since the winding reel and the feeding reel 200 are selectively determined according to operating mode of the cassette player, the winding reel and the feeding reel are the same in construction.

Hereinafter, the feeding reel will be described.

A hollow cylindricalal boss 210 with a predetermined diameter of which the top is open is installed on a predetermined position of plate 100.

A cylindrical main shaft 240 is inserted into the upper portion of boss 210. A rotating reel 230 is fixed at the top of main shaft 240 for rotating feeding reel 200. Rotating reel 230 is to accommodate a cassette tape and to rotate the cassette tape by its own rotation.

A reel spindle 270 is inserted into main shaft 240 at upper position of boss 210. Reel spindle 270 has a through cylindrical rod 271 formed at a center thereof and an accommodating portion 275. The accommodating portion 275 has a first circular plate 272 formed to be extended radially from bottom of the hollow cylindrical rod 271 to the outside and a first side wall 273 formed to be bent upwardly from the circumference of the first circular plate 272. The accommodating portion 275 has a plurality of first ribs 274 upwardly projected on upper surface thereof and arranged in radial direction.

The accommodating portion 275 of the reel spindle 270 is filled with gel G of the predetermined depth.

A reel gear 250 is placed on the accommodating portion 275 of the reel spindle 270 in which the through cylindrical rod 271 of the reel spindle 270 is inserted into the through hole 251 of the reel gear 250. The reel gear 250 has a second circular plate 252 with a through hole 251 formed at a center thereof, and a second side wall 253 formed to be bent downwardly from the circumstance of the second circular plate 252. The reel gear 250 has a plurality of second ribs 254 downwardly projected on bottom surface thereof and arranged in radial direction. The main shaft 240 is inserted through the through hole 251.

The through cylindrical rod 271 of the reel spindle 270 is inserted into the through hole 251 of the reel gear 250 adjoin each other in the state that gel G is sandwiched therebetween.

A spring 260 is installed to be penetrated by the main shaft 240 at the upper position of the reel gear 250. Spring 260 is bound in the main shaft 240 by the rotating reel 230 installed at the top of the main shaft 240. Spring 260 keeps the top of reel gear 250 down with an elastic repelling force so that reel gear 250 can stick to gel G and the circular plate 272 of the reel spindle 270.

Hereinafter, an operation of the reel of the tape player of the present invention will be described.

According to the above mentioned reel of the tape player with gel G, in the state that the tape is inserted into the rotating reel 230 installed on the top of the feeding reel, when playing the winding reel is rotated by the reel driving motor (not shown) while the feeding reel 200 installed at a predetermined interval from the winding reel is continuously rotated. At this time, the cassette tape is wound from the feeding reel to the winding reel via the head, whereby the reproduction of information is carried out.

The winding reel is rotated at the proper speed so that the cassette tape can run at a constant speed. Here, reel gear 250 of the feeding reel 200 is rotated on the main shaft 240 fixed on boss 210 of plate 10 in the state it is pressurized by spring 26. Here, since gel G is put between the reel gear 25 and the circular plate 27b of the reel spindle 27, gel G can generate slippages. More particularly, a plurality of second ribs 254 downwardly projected and arranged in radial direction on bottom surface of the second circular plate 252 of the reel gear 250 and a plurality of first ribs 274 upwardly projected and arranged in radial direction on upper surface of the first circular plate 272 of the reel spindle 270 are closely adjoined to gel so as to improve the effect of slippage generation.

Due to this slippage, the winding speed of the winding reel and the unwinding speed of the feeding reel are in balance.

According to the reel of the tape player of the present invention, slippage is controlled by gel G which is filled between the reel gear and the reel spindle. Since gel G cannot be easily abraded even though it has been used during a long time, slippage is still generated to the same extent as the beginning. Even though gel G will somewhat abrade due to use over a long time, slippage is still generated to almost the same extent as the beginning due to the viscous property until gel G is worn out.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. A reel of a tape player for recording/reproducing information on/from a tape which comprises:
    a main shaft which is rotatably placed on a plate of a deck and has a rotating reel contacted with a top of the main shaft;
    a reel spindle which has a through cylindrical rod into which the main shaft is to be inserted for being rotated with rotation of the main shaft and the reel spindle having an accommodating portion which has a first plate part extended radially from a bottom of the rod, a side wall formed to be bent upwardly from an end of a radial extension of the first plate part, and a plurality of first ribs upwardly projected on an upper surface of the plate part and extending in radial directions;
    a reel gear which is placed on the accommodating portion of the reel spindle, the reel gear having a second plate part with a through hole through which the through cylindrical rod is inserted; and
    gel with which the accommodating portion of the reel spindle is filled to be contacted with the second plate part of the reel gear for generating friction between the reel spindle and the reel gear.

2. The reel of a tape player as claimed in claim 1, wherein the first plate part of the accommodating portion has a first circular plate formed to be extended radially from the bottom of the through cylindrical rod and said side wall formed to be bent upwardly from a circular edge of the first circular plate.

3. The real of a tape player as claimed in claim 1, wherein the reel gear has a plurality of second ribs downwardly projected on a lower surface of the second plate part thereof and extending in radial directions.

4. The reel of a tape player as claimed in claim 1, wherein the second plate part of the reel gear has a second circular plate with the through hole formed at a center thereof and a second side wall formed to be bent downwardly from a circular edge of the second circular plate.

5. A reel of a tape player for recording/reproducing information on/from a tape which comprises:
    a main shaft which is rotatably placed on a plate of a deck and has a rotating reel contacted with a top of the main shaft;
    a reel spindle which has a through cylindrical rod into which the main shaft is to be inserted for being rotated with rotation of the main shaft and the reel spindle having an accommodating portion which has a first circular plate formed to be extended radially from the bottom of the cylindrical rod, a first side wall formed to be bent upwardly from a circular edge of the first circular plate, and a plurality of first ribs upwardly projected on an upper surface thereof and extending in radial directions;
    a reel gear which is placed on the accommodating portion of the reel spindle, the reel gear having a second circular plate with a through hole formed at a center thereof in which the through cylindrical rod is inserted through the through hole, a second side wall formed to be bent downwardly from a circular edge of the second circular plate, and a plurality of second ribs downwardly projected on a lower surface of the second circular plate and extended in radial directions; and
    gel with which the accommodating portion of the reel spindle is filled to be contacted with the lower surface of the second circular plate of the reel gear for generating friction between the reel spindle and the reel gear.

6. A reel of a tape player for recording/reproducing information on/from a tape which comprises:
    a main shaft which is rotatably placed on a plate of a deck and has a rotating reel contacted with a top of the main shaft;
    a reel spindle which has a through cylindrical rod into which the main shaft is to be inserted for being rotated with rotation of the main shaft and the reel spindle having an accommodating portion which has a plate part extended radially from a bottom of the rod, and a side wall formed to be bent upwardly from an end of a radial extension of the plate part;
    a reel gear which is placed on the accommodating portion of the reel spindle, the reel gear having a second plate part with a through hole through which the through cylindrical rod is inserted, the reel gear having a plurality of second ribs downwardly projected on a lower surface of the second plate part and extended in radial directions; and
    gel with which the accommodating portion of the reel spindle is filled to be contacted with the lower surface of the second plate part of the reel gear for generating friction between the reel spindle and the reel gear.

7. The reel of a tape player as claimed in claim 6, wherein the second plate part of the reel gear has a second circular plate with the through hole formed at a center thereof and a second side wall formed to be bent downwardly from a circular edge of the second circular plate.

* * * * *